Feb. 25, 1930.　　C. HELSCHER ET AL　　1,748,605
BUILDING OPENING GROUND
Filed Aug. 10, 1925
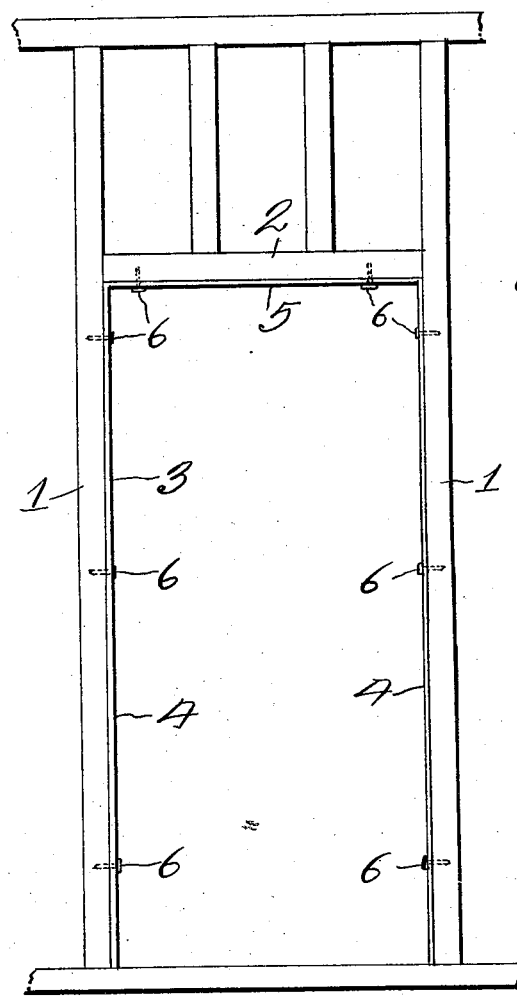
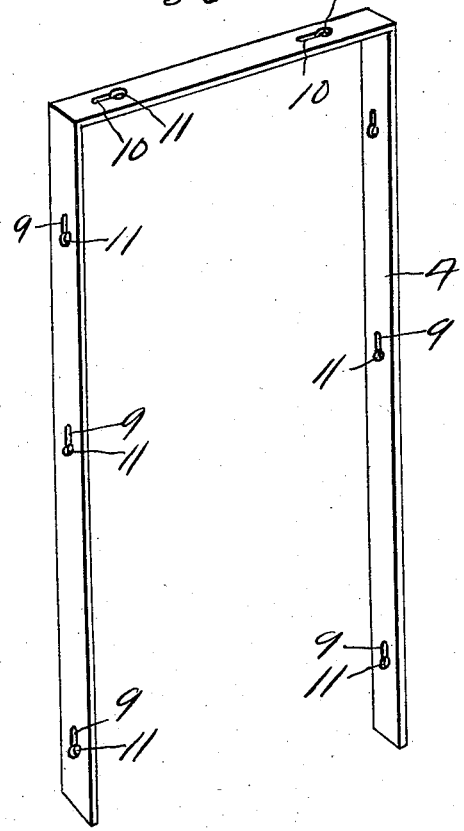
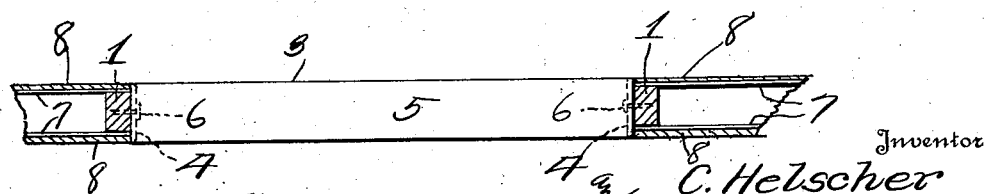
Inventor
C. Helscher
P. Tabellion
By D. Swift
Attorney Patented Feb. 25, 1930

1,748,605

UNITED STATES PATENT OFFICE

CHRISTIAN HELSCHER AND PETER TABELLION, OF MASSILLON, OHIO

BUILDING-OPENING GROUND

Application filed August 10, 1925. Serial No. 49,323.

The invention relates to grounds for door openings of buildings, and has for its object to provide a device of this character comprising a horizontal portion having right angularly disposed downwardly extending arms adapted to be secured to studding of a door opening, easily and quickly by plumbing one of the vertically disposed arms and securing the same to the studding at one side of the door opening, and as the vertically disposed arms are in parallel relation, it is obvious by the plumbing of one side the entire ground will be properly plumbed in relation to the door opening.

A further object is to provide the ground with vertically disposed slots into the upper ends of which nails may be driven for securing the ground to the studding and header, and the lower ends of said slots with enlarged portions through which the nail heads will pass when the ground is forced upwardly, thereby allowing the ground to be easily and quickly removed as desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a view in elevation of a door opening showing the ground disposed therein.

Figure 2 is a perspective view of the ground.

Figure 3 is a horizontal sectional view through the door opening studding, showing the ground therebetween.

Referring to the drawing, the numeral 1 designates spaced vertically disposed studding of a door opening, and 2 a header, which connects the studding 1 together adjacent their upper ends. Door openings, incident to the rough work in placing studdings and headers, are not square for the reception of their facings, and at the same time, during the plastering operation, which is done before the door facings are placed in position, it has been the practice to nail grounds in place, which grounds are afterwards removed or the facings secured thereto, therefore it will be seen that the present practice involves the expenditure of a great deal of lumber and material, as well as labor. To obviate the above difficulty a U-shaped ground 3 is formed from a single piece of metal of any thickness desired and which ground comprises vertically disposed arms 4, which are in parallel relation to each other, and the horizontal portion 5, which is disposed at a right angle to the portions 4. It will be seen that the door opening may be easily and quickly squared by securing one of the arms 4 to one of the studdings 1 by means of nails 6 and plumbing said arm, and that by plumbing said arm, the other parallel arm 4 and the right angularly disposed portion 5 of the U-shaped ground will be properly positioned, and the opposite sides of the ground will extend beyond the opposite sides of the studding 1 and header 2 a distance equal to the thickness of the lath 7 and plaster 8 of the wall, and said opposite sides of the ground will form a guide on which the plasterer's straight edge will move during a plastering operation, thereby insuring the plastering to the proper position in relation to the door opening, consequently allows the door facing to be easily and quickly placed in position after the ground 3 has been removed. The edges of the ground are preferably slightly rounded so that they will not mar the plasterer's straight edge during a plastering operation. The nails 6 extend through vertically disposed slots 9 in the arms 4 and the horizontal slots 10 in the portion 5, and which slots at one of their ends terminate in enlargements 11 through which the nail heads will pass, therefore it will be seen by providing the slots, upward and downward adjustment may be made as well as transverse adjustment during the squaring operation or when removing the ground from position. It will be understood that during the squaring operation, the studding 1 and header 2 may be squared in relation to the ground by wedges or blocks placed between the ground and the studding or header.

From the above it will be seen that a door opening ground is provided which is simple in construction, formed from a single piece of metal, and by plumbing one side of said ground the other sides thereof will also be plumbed, thereby allowing the ground to be easily and quickly placed in position.

The invention having been set forth what is claimed as new and useful is:—

A door opening ground comprising a U-shaped member, said U-shaped member being formed from a single strip of flat metal bent to form, and of uniform width and thickness.

In testimony whereof we have signed our names to this specification.

CHRISTIAN HELSCHER.
PETER TABELLION.